United States Patent [19]

Mueller et al.

[11] Patent Number: 5,200,676
[45] Date of Patent: Apr. 6, 1993

[54] MULTIPLEXED VEHICLE WINDOW WIPER CONTROL

[75] Inventors: Donald L. Mueller, Dayton; Michael B. Monahan, Miamisburg; Amanda R. Wright, Fairborn, all of Ohio

[73] Assignee: General Motors Corporation, Detroit, Mich.

[21] Appl. No.: 865,620

[22] Filed: Apr. 9, 1992

Related U.S. Application Data

[63] Continuation-in-part of Ser. No. 734,025, Jul. 22, 1991, abandoned, which is a continuation of Ser. No. 633,627, Dec. 20, 1990, abandoned.

[51] Int. Cl.$^5$ .............................................. B60S 1/08
[52] U.S. Cl. ............................... 318/444; 15/250.12; 307/10.1; 340/825.79; 340/870.13; 318/DIG. 2
[58] Field of Search ............... 318/443, 444, 480, 483, 318/DIG.2; 307/9.1, 10.1; 15/250 R, 250.12; 364/424.05; 340/825.03, 826, 825.79, 825.83, 825.89, 825.9, 870.13

[56] References Cited

U.S. PATENT DOCUMENTS

| | | | |
|---|---|---|---|
| 2,471,138 | 5/1949 | Bartelink | 250/9 |
| 3,862,363 | 1/1975 | Tanimoto | 179/15 |
| 3,864,578 | 2/1975 | Lackey | 307/10 |
| 4,176,250 | 11/1979 | Berglind | 179/1 |
| 4,241,444 | 12/1980 | Kiste | 370/85 |
| 4,290,134 | 9/1981 | Hampshire | 370/92 |
| 4,370,561 | 1/1983 | Briggs | 307/9.1 |
| 4,492,904 | 1/1985 | Graham | 318/444 |
| 4,547,716 | 10/1985 | Johnson et al. | 318/443 |
| 4,578,591 | 3/1986 | Floyd et al. | 307/10 |
| 4,663,575 | 5/1987 | Juzswik et al. | 318/444 |
| 4,827,198 | 5/1989 | Mueller et al. | 318/483 |
| 4,859,867 | 8/1989 | Larson et al. | 307/10 |
| 4,873,451 | 10/1989 | Pristera et al. | 307/10.1 |
| 4,916,374 | 4/1990 | Schierbeek et al. | 318/483 |
| 4,942,349 | 7/1990 | Millerd et al. | 318/483 |
| 4,942,571 | 7/1990 | Moller et al. | 370/85.1 |
| 4,953,163 | 8/1990 | Miyamoto et al. | 370/100.1 |
| 5,015,931 | 5/1991 | Muller | 318/483 |

*Primary Examiner*—Bentsu Ro
*Attorney, Agent, or Firm*—Robert M. Sigler

[57] ABSTRACT

A window wiper system for an automotive vehicle provides multiplex encoding of a control switch signal and an additional wiper control signal in a two-channel multiplex control signal and decoding of the multiplex control signal by the wiper mechanism for control of wiper operation. The multiplex control signal is a cyclical waveform containing alternating cycles of different first and second periods wherein the duty cycle of the first period cycles is determined by the additional wiper control signal and the duty cycle of the second period cycles is determined by the control switch. The additional wiper control signal may be derived from a rain sensor, an intermittent delay control resistor or any other device on the passenger side of the vehicle firewall which generates a signal controlling wiper operation.

14 Claims, 10 Drawing Sheets

MULTIPLEXED VEHICLE WINDOW WIPER CONTROL

BACKGROUND OF THE INVENTION

This is a continuation-in-part of U.S. patent application Ser. No. 07/734,025, filed Jul. 22, 1991, which was a continuation of U.S. patent application Ser. No. 07/633,627, filed Dec. 20, 1990, both now abandoned.

This invention relates to windshield wiper apparatus for an automotive vehicle, and particularly to such apparatus having minimal signal connections through the vehicle firewall from the operator control to the wiper motor. It is desirable to minimize the signal connections as much as possible to reduce the wire and connectors needed for the vehicle wiring harness. This consequently reduces the cost and complexity of the vehicle wiring harness. The invention contributes to such reduction by combining two imputs, such as a control switch and a rain sensor input, on a single, two-channel time division multiplexed connection between a multiplex encoder on the passenger side of the firewall and a multiplex decoder on the engine side.

SUMMARY OF THE INVENTION

The invention is a windshield wiper control system having a variable position control switch, an additional wiper control device and a wiper mechanism. It includes a multiplex encoder located on the passenger side of the firewall, a multiplex decoder on the engine side, and a single conductor connected therebetween over which a multiplex control signal is applied from the encoder to the decoder.

The multiplex encoder includes means for generating a multiplex control signal as a cyclical waveform containing cycles having different first and second periods. The duty cycle of the first period cycles is determined by the value of the additional wiper control device, and the duty cycle of the second period cycles is determined by the position of the control switch.

The multiplex decoder includes means for controlling the wiper mechanism in response to the respective duty cycles of the first and second period cycles. This provides a two-channel time division multiplex operation which transmits the control switch and additional wiper control device inputs over a single conductor. The additional wiper control device input is conveyed in one channel of the multiplex control signal and is represented by the duty cycle of the first period cycles. The control switch position is conveyed in the other channel of the multiplex control signal and is represented by the duty cycle of the second period cycles.

This invention is advantageous to an automotive vehicle because only one wiper control wire extends through the vehicle firewall from the multiplex encoder to the multiplex decoder. In addition, this invention has a further advantage of reducing the number of connectors that are needed for the wiper motor.

The additional wiper control device may be a rain sensor mounted on or adjacent the vehicle windshield. It may, alternatively, be an intermittent delay control resistor or any other device which generates a signal for wiper control and is located on the passenger side of the vehicle firewall. In the case of a resistive rain sensor, some embodiments of this invention provide for reversing polarity of the voltage applied thereto to prevent a buildup of charge in the water on the windshield.

Further details and advantages of this invention will be apparent from the accompanying drawings and following description of preferred embodiments.

SUMMARY OF THE DRAWINGS

FIG. 4(A–E) shows a series of timing diagrams helpful in understanding the operation of the circuit of FIG. 3.

FIG. 6(A–E) shows a series of timing diagrams illustrating the operation of the embodiment of FIG. 5.

DETAILED DESCRIPTION OF A PREFERRED EMBODIMENT

Figure 1:
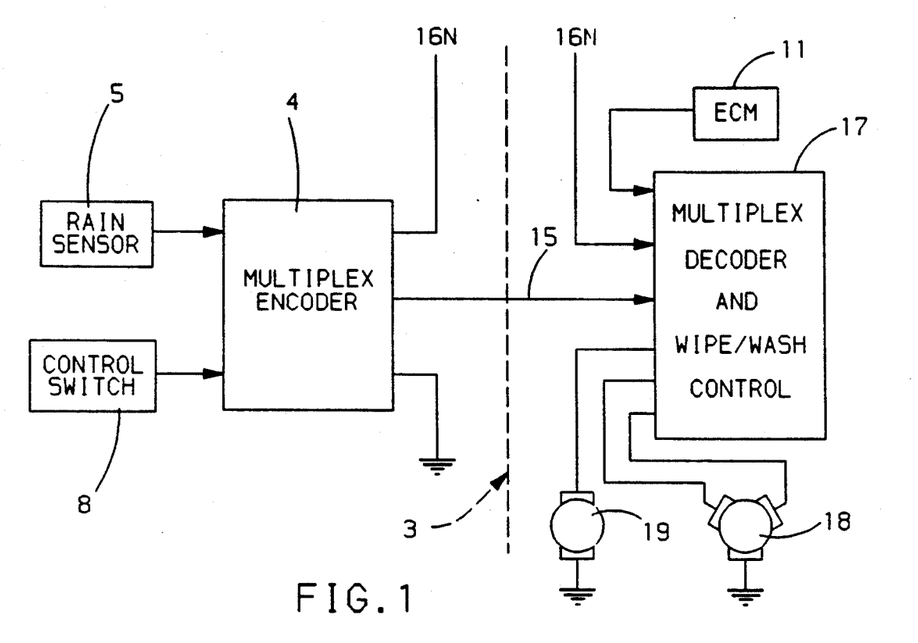
FIG. 1 is a schematic and block diagram of a vehicle window wiper system according to this invention.
Figure 2:
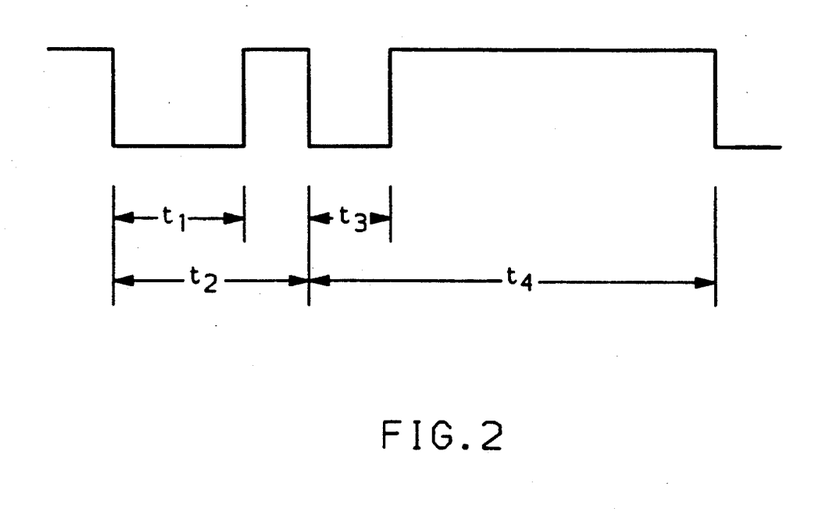
FIG. 2 shows a waveform of a multiplexed signal generated in the system of FIG. 1.

FIG. 1 of the drawing shows a windshield wiper system having a two channel time division multiplex controller. The multiplex controller utilizes a multiplex encoder 4, which may be located on the passenger side of a vehicle firewall 3, to encode signals from a rain sensor 5 and a control switch 8 into a single multiplex control signal. The multiplex control signal, as shown in FIG. 2, is a cyclical rectangular waveform having alternating first and second periods of durations $t_2$ and $t_4$, respectively. The periods of first duration $t_2$ form a first information channel; the periods of second duration $t_4$ form a second information channel; and the alternation of the first and second periods provides time division multiplexing. In each first period, the waveform switches between low and high voltages at a time determined by rain sensor 5 to provide rain sensor information in a first channel duty cycle of ratio $t_1/t_2$. In each second period, the waveform switches between low and high voltages at a time determined by control switch 8 to provide control switch information in a second channel duty cycle of ratio $t_3/t_4$. This multiplex control signal is transmitted over a single conductor 15 extending through firewall 3 to a multiplex decoder and wipe/wash control 17 located on the engine side of firewall 3. Control 17 provides multiplex decoding of the signal on conductor 15 for control of wipe motor 18 and wash motor 19 in response to the respective duty cycles of the first and second period cycles.

The invention, although not to be so limited, is designed for and produces its greatest advantage in a window wiper system with fully automatic capability. The wiper control switch, for example, in addition to an OFF position and optional manual selection positions for MIST (single wipe), LO speed continuous operation, HI speed continuous operation and WASH, may include one or more AUTO positions, in which wiper operation is controlled automatically in response to the rain sensor signal. This automatic control may include on-off wiper selection, continuous-intermittent wiper selection and/or pause time adjustment of intermittent operation. Several AUTO positions may be provided for operator control of system moisture sensitivity; but, since pause time is to be automatically controlled, there is no need for a third channel for separate pause time control information. Control 17 may include one or more inputs from additional sensors or other controls such as engine control module (ECM) 11 which further affect wiper operation. For example, a park/neutral input from the vehicle transmission or ECM could be used to prevent automatic wiper operation when the vehicle transmission is in park or neutral. This would prevent inadvertent wiper operation in car washes or when the vehicle is parked with the engine running.

Figure 3:
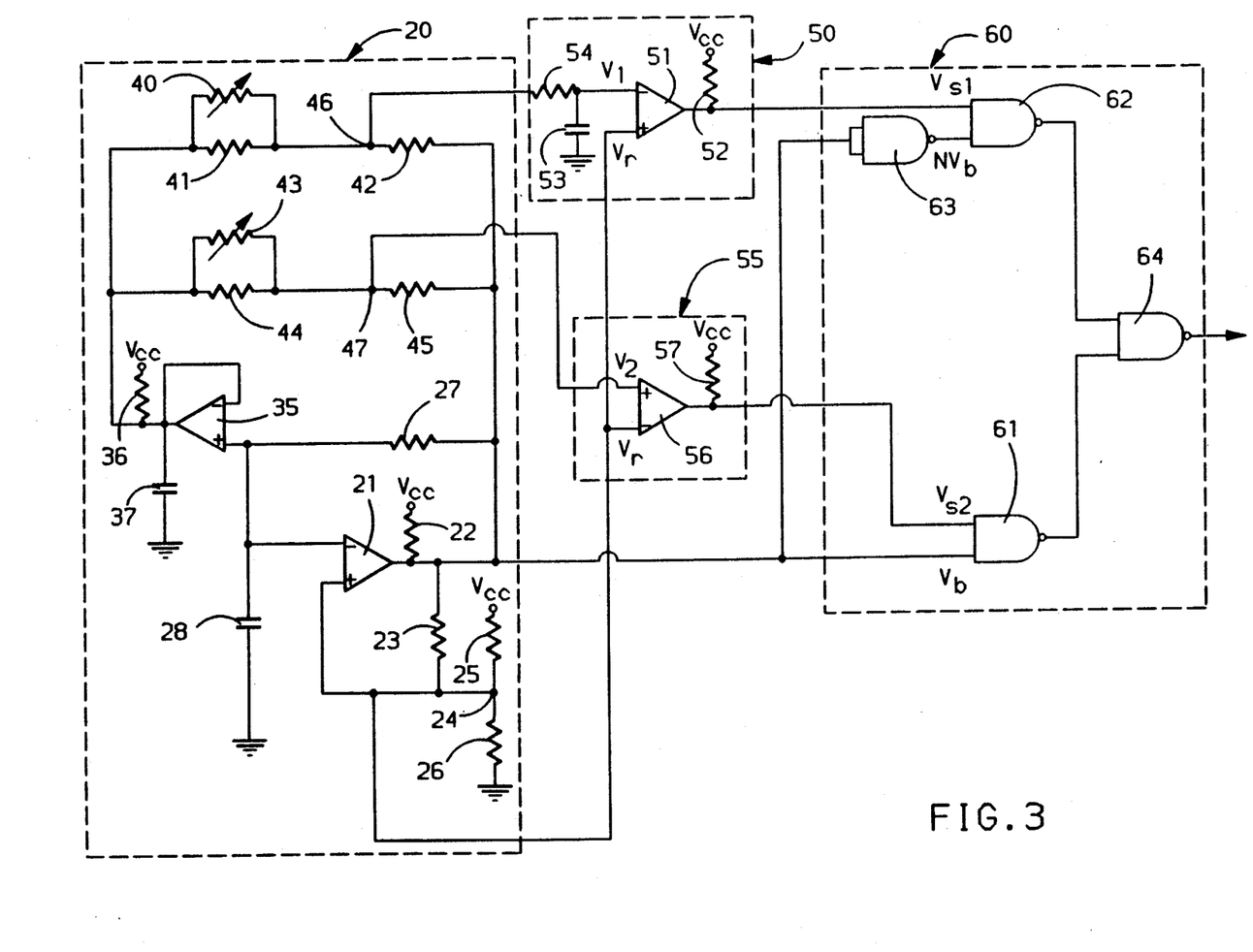
FIG. 3 is a circuit diagram of a first embodiment of a multiplex encoder for use in producing the signal of FIG. 2 in the system of FIG. 1.

FIG. 3 shows a circuit diagram of the original embodiment of multiplex encoder 4, using discrete circuit elements. Multiplex encoder 4 comprises a base signal generator 20, a first slave signal generator 50, a second slave signal generator 55, and logic apparatus 60. Base signal generator 20 produces a base signal $V_b$ having alternating first and second periods of different constant durations, which signal establishes the basic periods of the multiplex control signal. First slave signal generator 50 produces a signal $V_{S1}$ keyed to base signal $V_b$ but phase shifted therefrom to switch during the base signal's successive first periods. Likewise, second slave signal generator 55 produces a signal $V_{S2}$ keyed to base signal $V_b$ but phase shifted therefrom to switch during the base signal's successive second periods. Logic apparatus 60 combines the base signal and the first and second slave signals to generate the multiplex control signal. The phase shift of the first slave signal is responsive to rain sensor 5 to determine the duty cycle $t_1/t_2$ of the first period of the multiplex control signal. The phase shift of the second slave signal is responsive to control switch 8 to determine the duty cycle $t_3/t_4$ of the second period of the multiplex control signal.

In more detail, base signal generator 20 comprises an oscillator built around a comparator 21 with an output connected through a pull up resistor 22 (4.7K) to a positive DC supply voltage $V_{cc}$ and through a positive feedback resistor 23 (100K) to its non-inverting input, which is also connected to the junction 24 of a voltage divider comprising resistors 25 (100K) and 26 (100K) connected across supply voltage $V_{cc}$. The output of comparator 21 is also connected through a negative feedback resistor 27 (10K) to its inverting input, which is further connected through a capacitor 28 (0.470 uF) to ground.

Comparator 21 and its associated passive components 22-28 form a standard relaxation oscillator which alternately charges capacitor 28 through resistors 22 and 27 and discharges capacitor 28 through resistor 27 and the output transistor of comparator 21. The resulting voltage waveforms can be seen in FIG. 4(A). Curve 30 of FIG. 4(A), which is seen as a solid line comprising alternating ascending and descending exponential curves, shows voltage $V_c$ across capacitor 28; and curve 31, seen as a solid rectangular wave, shows voltage $V_r$ applied to the non-inverting input of comparator 21. The output of comparator 21 comprises the base signal $V_b$, which is shown as curve 65 in FIG. 4(B). Signal $V_b$ has half cycles of longer and shorter duration due to the different charge and discharge rates of capacitor 28; and these half cycles of differing duration define the first and second channels of the multiplex control signal in a manner to be described.

In order to generate the first and second slave signals, additional elements are placed in the negative feedback loop of comparator 21 in parallel with resistor 27. A buffer 35 comprises a comparator with a non-inverting input connected to the inverting input of comparator 21 and an output connected to its inverting input in negative unity gain feedback and further connected through a resistor 36 (10K) to supply voltage $V_{cc}$ and through a capacitor 37 (0.10 uF) to ground. Rain sensor 5 and control switch 8 are each represented by an equivalent variable resistance connected in series with a fixed resistor between the output of buffer 35 and the output of comparator 21. In particular, rain sensor 5, represented by a variable resistor 40 in parallel with a fixed resistor 41 (200K), is connected in series with a fixed resistor 42 (100K). Rain sensor 5 may be a resistive sensor, whereby variable resistance 40 may be one or more pairs of electrodes separated by gap(s) on a vehicle window and thus having a resistance which decreases when a gap is bridged by water. Variable resistance 40 may alternatively be the equivalent resistance of a resistive network including a water variable resistor. However, any rain sensor may be adapted to the apparatus of this embodiment by providing interface circuitry converting the output of the rain sensor to a resistance varying therewith. Furthermore, rain sensor 5 may include processing elements in addition to sensing elements so that the resistance of resistor 40 represents a wiper control signal derived from the amount of moisture based on a control algorithm not shown or described herein and encoded as a variable resistance for application to encoder 4. Likewise, control switch 8, represented by a variable resistor 43 in parallel with a fixed resistor 44, is connected in series with a fixed resistor 45 (100K). Control switch 8 may comprise any known switched resistor network to provide variable resistor 43 having a resistance which varies with switch position.

Signal $V_1$ is a voltage derived from the junction 46 of resistors 40 and 42; and signal $V_2$ is the voltage at junction 47 of resistors 43 and 45. Voltages $V_1$ and $V_2$ are shown as curves 48 and 49 of FIG. 4(A). Voltage $V_1$ is derived from the output of a voltage divider, one end of which is connected through buffer 35 to capacitor 28 and the other end of which is connected to the output of comparator 21, which switches between two predetermined constant voltages. Thus, voltage $V_1$, as seen in the dashed line curve 48, comprises a series of alternating ascending and descending exponential curves corresponding to, but vertically spaced from, the similar exponential curves of voltage $V_c$. Curve 30, showing the voltage across capacitor 28, is continuous; but curve 48, showing the voltage at junction 46, jumps vertically at each transition between ascending and descending exponential portions, so that the ascending portions of curve 48 are above the corresponding portions of curve 30 and the descending portions of curve 48 are below the corresponding portions of curve 30. The amount of vertical shift of curve 48 relative to curve 30 is a function of the resistance of variable resistor 43 and thus of the rain sensor 5. The preceding is similarly true for the alternating dash/dot curve 49, which represents the voltage $V_2$ at junction 47 and which is shifted by an amount which is a function of control switch 8.

Signal $V_r$ and the voltage at junction 46 are provided to first slave signal generator 50 for the generation of the phase shifted first slave signal $V_{S1}$, shown as curve 66 in FIG. 4(C). A comparator 51 has an output connected through a pull up resistor 52 (10K) to supply voltage $V_{cc}$, a non-inverting input connected to the non-inverting input of comparator 21 to receive voltage $V_r$ and an inverting input connected through a capacitor 53 to ground and through a resistor 54 (10K) to junction 46 so that voltage $V_1$ is applied thereto. Referring to FIG. 4(A), curve 48 of voltage $V_1$ crosses curve 31 of voltage $V_r$ in each alternating high and low period of voltage $V_r$ at a point phase shifted from the point at which curve 30 of voltage $V_c$ crosses curve 31 of voltage $V_r$. Thus, the output first slave signal $V_{S1}$ is phase shifted with respect to the base signal $V_b$.

Signals $V_r$ and $V_2$ are provided to second slave signal generator 55. A comparator 56 has an output connected through a pull up resistor 57 (10K) to supply voltage $V_{cc}$, an inverting input connected to the non-inverting input of comparator 21 to receive therefrom voltage $V_r$ and a non-inverting input connected to voltage $V_2$ at junction 47. The output of comparator 56 is the second slave signal $V_{S2}$, shown as curve 67 of FIG. 4(D), which is phase shifted with respect to $V_c$, similarly to first slave signal $V_{S1}$ but inverted therefrom due to the reversed application of corresponding signals to the comparator inputs.

Base signal $V_b$ and the slave signals $V_{S1}$ and $V_{S2}$ are provided to logic apparatus 60 to generate the multiplex control signal. Logic apparatus 60 comprises a NAND gate 61 receiving signals $V_b$ and $V_{S2}$ on its inputs and a NAND gate 62 receiving on its inputs signals $V_{S1}$ and $NV_b$, the latter being an inverted signal $V_b$ produced by an inverter connected NAND gate 63. The outputs of NAND gates 61 and 62 are provided to a NAND gate 64, the output of which is the multiplex control signal, shown as curve 68 of FIG. 4(E). The relationships are shown in the additional curves 65-68 of FIGS. 4(B)-4(E), respectively. Curve 65 of FIG. 4(B) is the base signal $V_b$, which is the output of the oscillator comprising comparator 21 and its associated components. It comprises alternating different periods of high and low voltage. Curve 66 of FIG. 4(C) is the first slave signal $V_{S1}$, which is phase shifted with respect to $V_b$. Curve 67 of FIG. 4(D) is the second slave signal $V_{S2}$, which is phase shifted and inverted with respect to $V_b$. Logic apparatus 60 ensures that the multiplex control signal changes state in response to each state change of base signal $V_b$ but changes state in response to $V_{S1}$ only during the high voltage (first channel) periods of $V_b$ and in response to VS2 only during the low voltage (second channel) periods of $V_b$. The result is a time division multiplexed two channel signal with information in each channel contained in the duty cycle thereof. FIG. 4(E) identifies the periods $t_1$-$t_4$ of the multiplex control signal corresponding to those shown in FIG. 2.

Control 17 includes elements for the decoding of the multiplex control signal on line 15. These elements may include a digital computer adapted to generate an interrupt with each voltage change of the multiplex control signal and a stored program having an interrupt routine including a DEMULTIPLEX portion for identifying the first and second channels of the signal and sensing and storing the information therein. The operation of control 17 in this respect is shown in the flow chart of FIG. 11. In considering this flow chart, it is to be understood that with each interrupt control 17 identifies whether the voltage change producing the interrupt is a rising or falling edge of the waveform.

Figure 11:
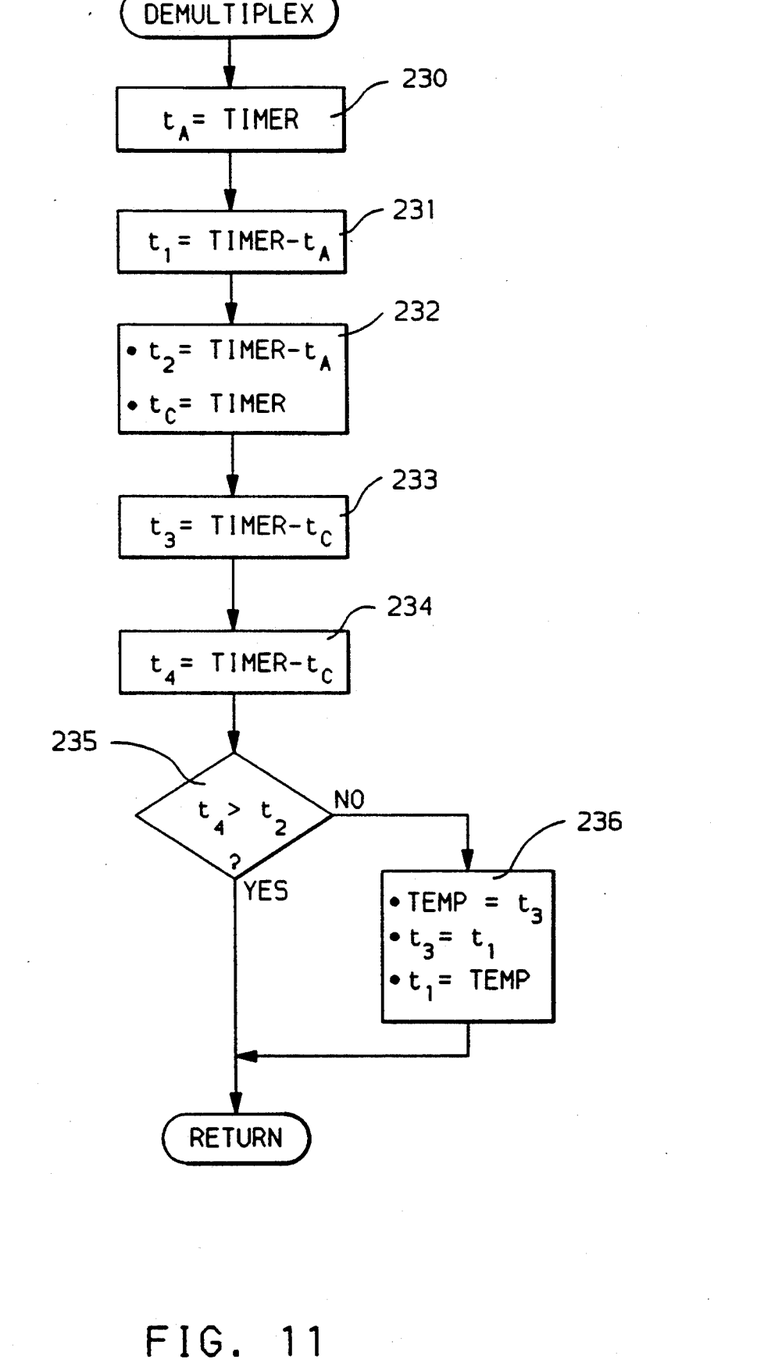
FIGS. 11 and 12 show demultiplex flow charts.

The DEMULTIPLEX flow chart of FIG. 11 begins with an interrupt on a sensed falling edge (step 230), in which the contents of a free running timer is stored as an intermediate variable $t_A$. At the next interrupt, on a rising edge (step 231), $t_A$ is subtracted from the new timer contents and the difference is stored as $t_1$. At the next interrupt, on a falling edge (step 232), the new timer contents are subtracted from $t_A$, the difference is stored as $t_2$, and the new timer contents are stored as intermediate variable $t_C$. At the next interrupt, on a rising edge (step 233), $t_C$ is subtracted from the new timer contents and the difference is stored as $t_3$. At the next interrupt, on a falling edge, $t_C$ is subtracted from the new timer contents and the difference is stored as $t_4$. At this point, time durations for $t_1$-$t_4$ are stored for both channels of the multiplex control signal. However, the durations may be assigned to the wrong channels. To determine whether this is the case, $t_4$ is compared with $t_2$ at decision block 234. If $t_4$ is greater, the channel assumption was correct; and the routine may be exited with the correct values of $t_1$ and $t_3$ stored for use in controlling wiper motor 18 and washer motor 19. If $t_4$ is not greater than $t_2$, however, the channel assumption was not correct; and the contents of $t_1$ and $t_3$ must be exchanged. This is done in step 236, using a temporary memory location TEMP, before the routine is exited.

Figure 5:
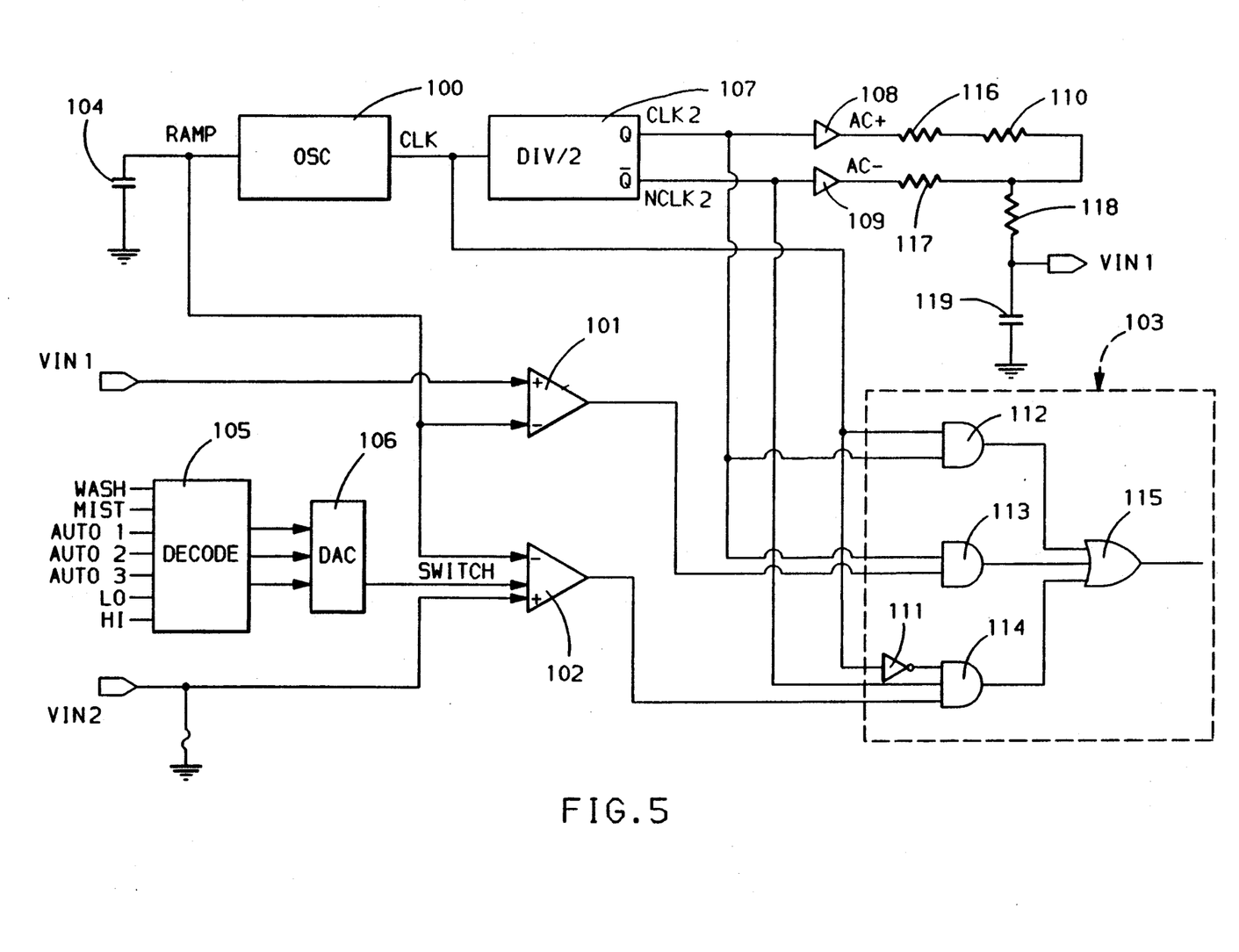
FIG. 5 is a schematic diagram of a second and preferred embodiment of a multiplex encoder for use in producing the signal of FIG. 2 in the system of FIG. 1.

FIG. 5 shows the basic layout of another embodiment of multiplex encoder 4, which is designed in bipolar integrated circuit technology and represents a preferred embodiment of the invention. The circuit includes a basic oscillator 100, a pair of slaved comparators 101 and 102, and an output logic circuit 103, as in the embodiment of FIG. 3. Its operation is similar to that of the circuit of FIG. 3 in that a RAMP signal from oscillator 100, which represents the voltage on a capacitor 104 being charged and discharged in oscillator operation, is provided to comparators 101 and 102 to be compared to inputs from rain sensor 5 and control switch 8 to generate outputs phase shifted from the oscillator output and that these outputs, together with output clock signals from the oscillator, are combined in an output logic circuit to produce the desired multiplexed signal. However, there is significant difference in the details of circuit operation and how the multiplexed channels are constructed.

The multiplex encoder of FIG. 5 has a rain sensor input VIN1 to the non-inverting input of comparator 101. The multiplex encoder further has alternative analog control switch inputs to the non-inverting input of comparator 102, one of which is analog input VIN2 and the other of which is decoded and D/A converted from a plurality of digital switch inputs. Thus, the circuit allows either analog or digital switch inputs from control switch 8. Analog input VIN2 may be grounded through a fuse to activate the alternative digital switch inputs but may be activated for analog input by blowing the fuse and forcing all digital inputs to states producing the lowest output from DAC 106. Seven digital switch inputs are provided in this application and decoded in a decoder 105 into a three bit digital word, which is provided to a digital to analog comparator (DAC) 106. There is an eighth position of the control switch corresponding to OFF; and this position corresponds to none of the digital inputs being selected. The output of DAC 106 thus provides a different analog voltage level for each of the alternative control switch inputs to comparator 102. Comparator 102 is designed to compare the higher of its analog input voltages (VIN2 or the output of DAC 106) with the oscillator RAMP signal. As shown, input VIN2 is grounded so that the DAC 106 input will be compared to the oscillator RAMP signal in comparator 102. Likewise, comparator 101 compares its input signal VIN1 with the oscillator RAMP signal.

Oscillator 100 produces the RAMP signal with a constant frequency having a rising ramp or charge time five times the falling ramp or discharge time, as seen in curve 205 of FIG. 6(B). However, unlike the embodiment of FIG. 3, the rising and falling ramp times do not directly define two channels having periods differing by a factor of five. Rather, the two channels are created in alternating rising (longer) ramp times; and the multiplexed output signal is forced alternately high and low during successive falling (shorter) ramp times to add pairs of these times to alternate longer ramp times and thus create the alternating different time periods for first and second channel identification. The RAMP signal is provided to the inverting inputs of comparators 101 and 102.

Oscillator 100 further provides a rectangular CLK signal which is low during the longer rising portion of the RAMP signal and high during the shorter falling portion of the RAMP signal, as shown in curve 200 of FIG. 6(A). The CLK signal thus indicates the rising-/falling status of the RAMP signal. In addition, the CLK signal is divided in a divide-by-two (DIV/2) circuit 107 to form opposing square waves CLK2 and NCLK2 with half periods equal to the total period of the CLK signal. These opposing square waves are provided through buffer amplifiers 108 and 109 to form a signal across pads AC− and AC+ to drive the rain sensor resistor 110, together with series resistors 116 connected to AC+ and 117 connected to AC−, with an alternating current and thus ensure that the rain sensor sees an average voltage of zero to prevent electrical polarization of water on the vehicle windshield with a resistive rain sensor. The junction of rain sensor resistor 110 and resistor 117 is connected through a resistor 118 to terminal VIN1, which terminal is connected through a capacitor 119 to ground, so that resistor 118 and capacitor 119 form a low pass filter to remove noise from the rain sensor signal. If the rain sensor 5 is such that its resistance in this circuit is not affected by such considerations of electrical polarization on the windshield, the AC switching of the voltage across resistor 110 may be eliminated from the circuit and resistor 110 may be supplied with fixed voltages rather than CLK2 and NCLK2. In this case, the filtering of resistor 118 and capacitor 119 may be increased. In any case, however, the opposing square waves CLK2 and NCLK2 are provided, along with the CLK signal and the outputs of comparators 101 and 102, to output logic circuit 103.

The generation of the multiplexed signal in output logic circuit 103 will be described with reference to FIG. 5 and the waveforms of FIGS. 6(A)–6(F). The CLK output of oscillator 100 is shown as rectangular waveform 200 in FIG. 6(A), which comprises shorter high voltage portions 201 alternating alternating with longer (ratio 1:5 as previously described) low voltage portions 202. The RAMP voltage output of oscillator 100 is shown as waveform 205 of FIG. 6(B), which comprises falling voltage portions 207, occurring during portions 201 of waveform 200, alternating with rising portions 206, occurring during portions 202 of waveform 200. FIG. 6(B) also shows a waveform 210, which represents an assumed constant output of DAC 106 or VIN2, and a waveform 211, which represents the rain sensor input VIN1. FIGS. 6(C) and 6(D) show, respectively, waveforms 215 and 216, representing the CLK2 and NCLK2 outputs of DIV/2 circuit 107. FIG. 6(E) shows the multiplex control signal 220, which is derived from the signals shown in FIGS. 6(A)–6(D) in the logic circuit 103.

Referring to FIG. 5, Logic circuit 103 includes AND gates 112–114, each of which has an output connected to an input of an OR gate 115. AND gate 112 receives the CLK signal from oscillator 100 and signal CLK2 from DIV/2 circuit 107 on its two inputs. Thus, AND gate 112 will provide a high output only when the CLK and CLK2 signals are both high. This produces high voltage portion 221 of waveform 220. AND gate 113 receives signal CLK2 from DIV/2 circuit 107 and the output of comparator 101 on its two inputs. AND gate 113 provides that, when CLK2 is high, the multiplex control signal will remain high until the rising RAMP exceeds the rain sensor voltage VIN1. This produces high voltage portion 222 of waveform 220.

AND gate 114 has three inputs and receives signal NCLK2 from DIV/2 circuit 107, the output of comparator 102 and a signal NCLK derived by inverting signal CLK in an inverter 111. AND gate 114 thus provides that, when CLK and CLK2 are both low, the multiplex control signal will remain high until the rising RAMP exceeds the DAC output or VIN2 input, whichever is activated, to provide a high voltage portion 224 of waveform 220.

Since the outputs of AND gates 112–114 are combined in OR gate 115, the output of the latter is low whenever the outputs of AND gates 112–114 are all low. This defines additional low voltage portions 223, 225 and 226 of waveform 220. Low voltage portion 223 occurs when CLK and the output of comparator 101 are both low and CLK2 is high. Low voltage portion 225 occurs when CLK, CLK2 and the output of comparator 102 are all low. Low voltage portion 226 occurs when CLK is high and CLK2 is low.

Portions 224 and 225 define the first channel of the multiplex control signal, with high voltage portion 224 defining time $t_1$ and low voltage portion 225 added to high voltage portion 224 to define time $t_2$. As voltage VIN2 or the DAC 106 output increases and decreases in response to control switch 8, the relative durations of portions 224 and 225 change to produce a phase shift and corresponding change in the duty cycle ratio $t_1/t_2$ of the first channel during the longer, rising RAMP portions of oscillator cycles when CLK2 is low. Portions 222 and 223 are the corresponding portions for the second channel. However, in the second channel, portion 221 is added to portion 222 to define time $t_3$; and portion 226 is added to portions 221, 222 and 223 to define time $t_4$. As voltage VIN1 increases and decreases in response to rain sensor 5, the relative durations of portions 221 plus 222 and portions 223 plus 226 change to produce a phase shift and corresponding change in the duty cycle ratio $t_3/t_4$ of the second channel during the longer, rising RAMP portions of oscillator cycles when CLK2 is high.

Thus, the different durations of the first and second channels in the multiplex signal are produced by adding the previous and following high CLK pulses to every second low CLK pulse from oscillator 100; and the alternate multiplex channels can thus be identified by their time durations. It will be noted that the longer duration channel is used for the rain sensor information. This provides an advantage in the case of a rain sensor having an inherent capacitance, since the added time duration gives the rain sensor signal more chance to settle. It should also be noted that the embodiment of FIG. 5 will operate correctly even in the case of an open or shorted rain sensor.

Figure 4:
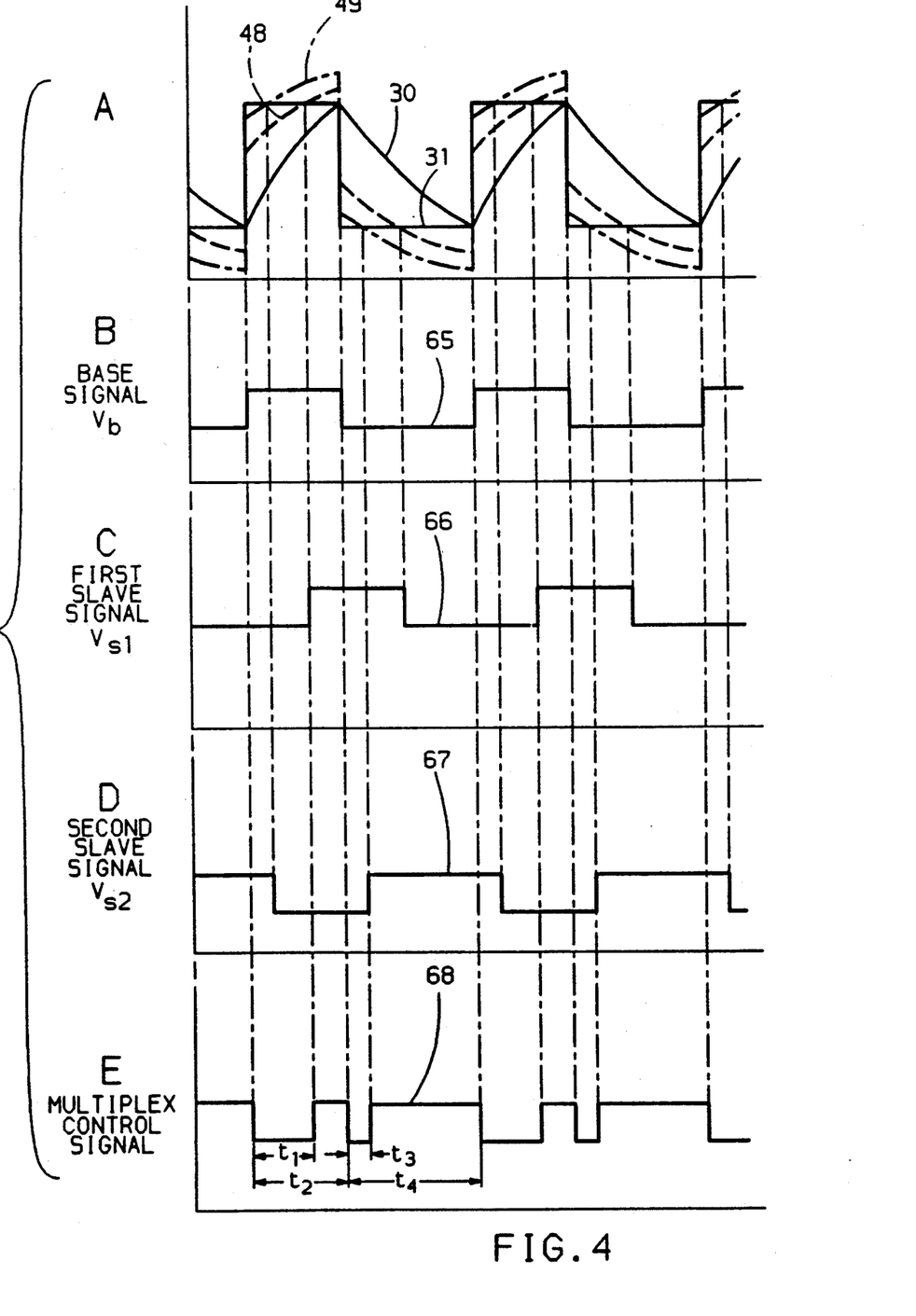
Figure 6:
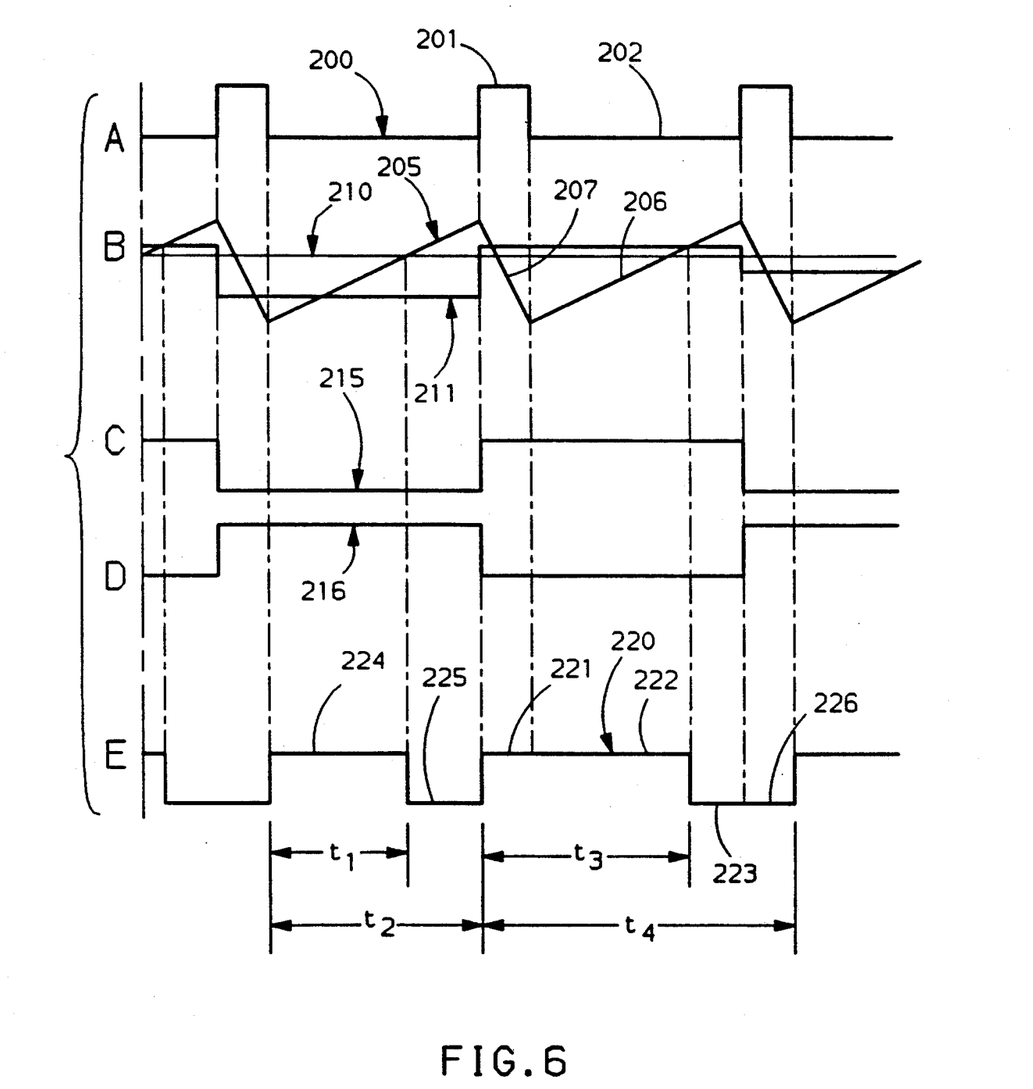

It should be noted that the multiplex control signal 220 of FIG. 6(E), produced by the embodiment of FIGS. 5 and 6 differs from that FIG. 4, produced by the embodiment of FIG. 3, in two respects. The first is the relative inversion of the first compared with the second: that is, each of the channels of waveform 220 in FIG. 6(E) comprises a high voltage portion followed by a low voltage portion rather than a low voltage portion followed by a high voltage portion as in waveform 68 of FIG. 4(E). The second is that time duration $t_2$ in waveform 220 of FIG. 6(E) includes the added time of portion 221, which is added for channel identification.

Figure 12:
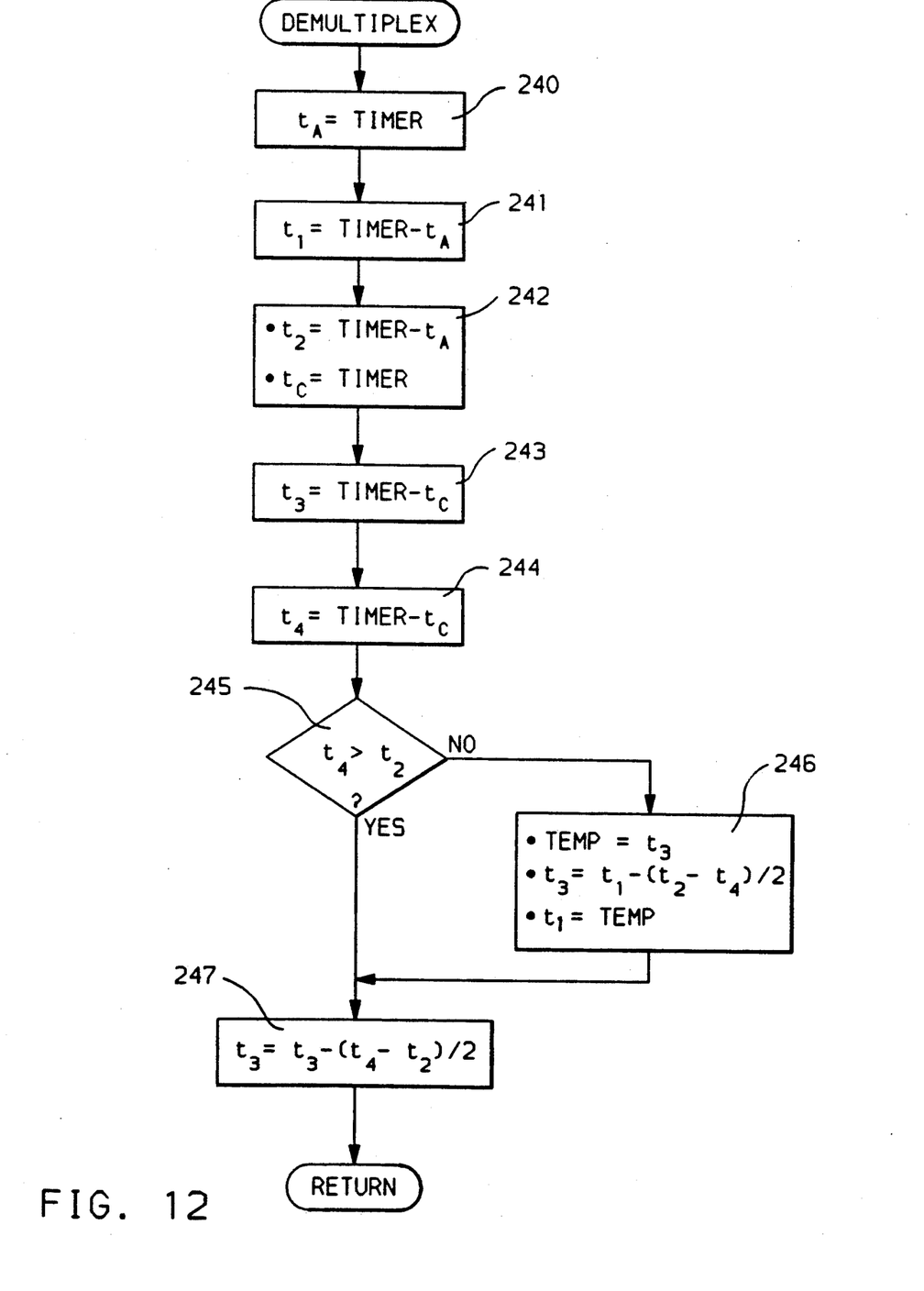

These differences are taken into account in a slightly revised DEMULTIPLEX routine for the embodiment of FIGS. 5 and 6 as shown in the flow chart of FIG. 12. Steps 240-245 of FIG. 12 are identical to steps 230-235 of FIG. 11 except that the rising and falling edges are inverted. Thus, step 240 is produced by a rising edge of the waveform, step 241 by a falling edge, etc. In addition, step 246 and an added step 247 of FIG. 12 delete the added duration of portion 221 from duration $t_3$ to recover the original information of the second multiplex channel. Otherwise, the demultiplexing of the signal shown in waveform 220 of FIG. 6(E) is identical to that of the signal shown in waveform 68 of FIG. 4(E).

Figure 7:
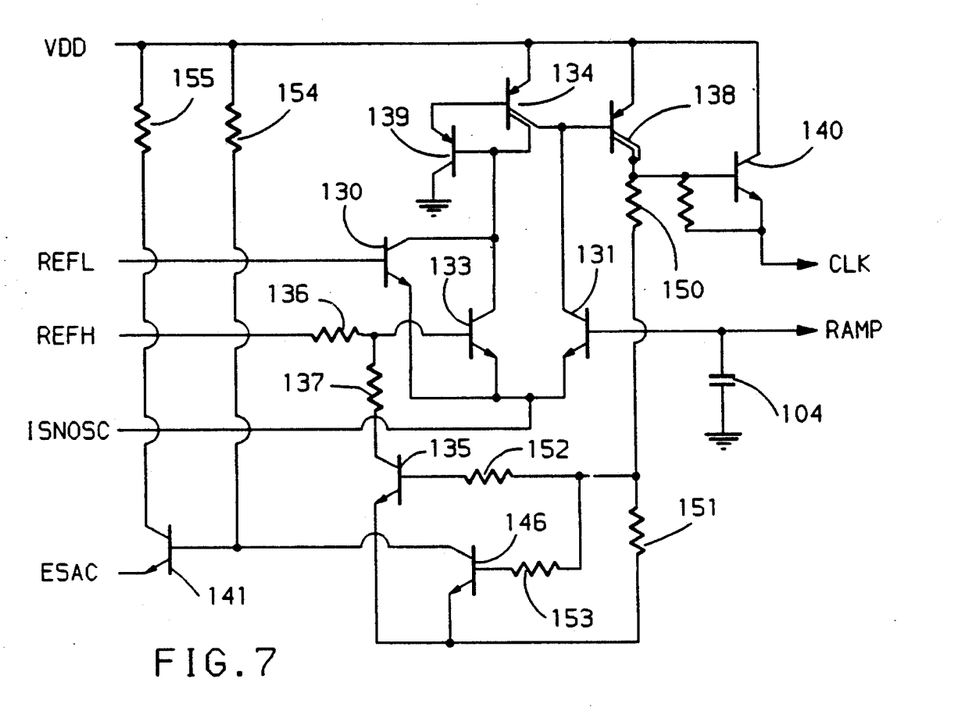
FIGS. 7–10 show circuit diagrams of portions of the embodiment of FIG. 5.
Figure 8:
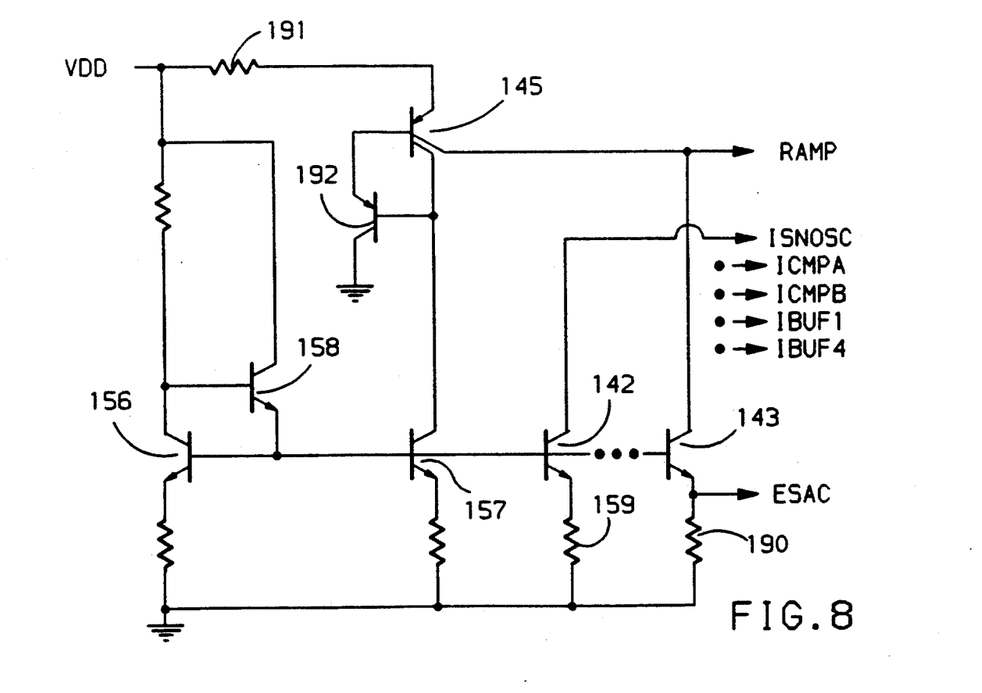

The circuit of oscillator 100 is shown in detail in FIGS. 7 and 8. Referring to FIG. 7, a bipolar IC comparator has NPN input transistors 130 and 131 with emitters connected together to a current sink ISNOSC. The collectors of transistors 130 and 133 are connected to dual collectors of a PNP transistor 134 having an emitter tied to supply voltage VDD and a base connected to the emitter of a grounded collector PNP transistor 139, the base of which is connected to one of the collectors of transistor 134 and the collector of transistor 130. An NPN transistor 133 is connected in parallel with transistor 130 to form a second input on one side of the comparator. A PNP transistor 138 has an emitter connected to supply voltage VDD, a base connected to the collectors of transistors 131 and 134 and a pair of emitters both connected to the base of an NPN transistor 140 having a collector connected to supply voltage VDD and an emitter providing output CLK. The collector of transistor 138 is further connected through resistors 150 and 151 in series to ground. The junction of resistors 150 and 151 is connected through a resistor 152 to the base of a grounded emitter NPN transistor 135 having a collector connected through a resistor 137 to the base of transistor 133 and is also connected through a resistor 153 to the base of a grounded emitter NPN transistor 146 having a collector connected to the base of an NPN transistor 141 and through a resistor 154 to VDD. Transistor 141 has a collector connected through a resistor 155 to VDD and an emitter providing a terminal ESAC.

The base of transistor 131 is connected through an external capacitor 104 to ground and through a RAMP terminal to additional apparatus in FIG. 8 to be described. The base of transistor 130 is provided with a constant base voltage of REFL (2.5 volts); and the base of transistor 133 is connected through a resistor 136 (5400 ohm) to a constant voltage REFH (5.0 volts) and through a resistor 137 (4500 ohm) to the collector of transistor 135. Thus, when transistor 135 is conducting, the base of transistor 133 is held lower than the base of transistor 130, which is at 2.5 volts. As will be seen, this is the case when capacitor 104 is discharging; and capacitor 104 will discharge until its voltage reaches the 2.5 volts on the base of transistor 130. When transistor 135 is not conducting, however, the base of transistor 133 is at a higher voltage (essentially 5 volts) than the base of transistor 130. This occurs while capacitor 104 is charging; and it can thus charge up to 5 volts. Transistor 135 is controlled by the output state of the comparator through transistors 138 and 135. Transistor 138 also controls transistor 140 to generate the CLK signal and transistors 146 and 141 to control a charge/discharge current circuit of FIG. 8 through terminal ESAC.

FIG. 8 shows a current sink generator which uses a current mirror comprising transistors 156, 157 and 158 to provide a plurality of constant current sinks (not all shown) for various circuits in the system, one of which is transistor 142, which has an emitter grounded through a resistor 159, a base connected to the base of transistor 156 and emitter of transistor 158 and which sinks a constant current of ISNOSC into its collector from the comparator of FIG. 7. Similar transistors, not shown, have bases connected to the base of transistor 142 and emitters grounded through resistors to provide similar current sinks on their collectors. These transistors are not specifically shown in FIG. 8; but their collectors are indicated by the labels of their current sinks: ICMPA, ICMPB, IBUF1-IBUF4 (providing current sinks for comparators 101, 102 and buffers 108, 109). In addition, an NPN transistor 143 has a base connected to the base of transistor 142 and an emitter connected through a resistor 190 to ground and providing a terminal ESAC connected to terminal ESAC of FIG. 7. The collector of transistor 143 is further connected to the ramp terminal, which is connected to the RAMP terminal of FIG. 7 and to a collector of a dual collector PNP transistor 145 having its other collector connected to the collector of transistor 157, its emitter connected through a resistor 191 to VDD and its base connected to the emitter of a PNP transistor 192 with a grounded emitter and a base connected to the collector of transistor 157.

Transistor 143 is turned on and off with transistor 141 of FIG. 7 and sinks a constant current of 6I when it is turned on. Transistor 145 provides a constant current of I to the RAMP terminal, from which capacitor 104 is connected to ground. Thus, when transistor 143 is turned on, it sinks the current I from transistor 145 and additionally draws a discharge current of 5I from capacitor 104, since its total current must be 6I. When transistor 143 is turned off, however, the current I from transistor 145 is provided to charge capacitor 104. The charge current of capacitor 104 is thus only one fifth the discharge current; and this accounts for the charge time of the oscillator being five times the discharge time.

In operation, the voltage on capacitor 104 varies between 2.5 and 5 volts. Capacitor 104 is discharging when transistor 143 is turned on. This occurs when transistor 138 is on, which turns on transistors 135 and 146. Transistor 146 turns off transistor 141 to allow transistor 143 to turn on and sink the discharge current. Transistor 140 is turned on to provide a high CLK signal, as indicated in FIG. 6b. In addition, transistor 135 pulls the voltage on the base of transistor 133 below 2.5 volts. This allows capacitor 104 to continue to discharge until the voltage on the base of transistor 131 falls slightly below the 2.5 volts on the base of transistor 130, at which point transistor 130 turns on to turn off transistors 131, 138, 140, 135 and 146. The output CLK signal goes low as transistor 140 turns off; the capacitor is forced to charge by the circuit of FIG. 8 as transistor 141 turns on to turn off transistor 143; and transistor 133 is provided with a base voltage of 5 volts as transistor 135 turns off so as to allow capacitor 104 to charge up to 5 volts, at which time transistor 131 turns on again to repeat the cycle.

Figure 9:
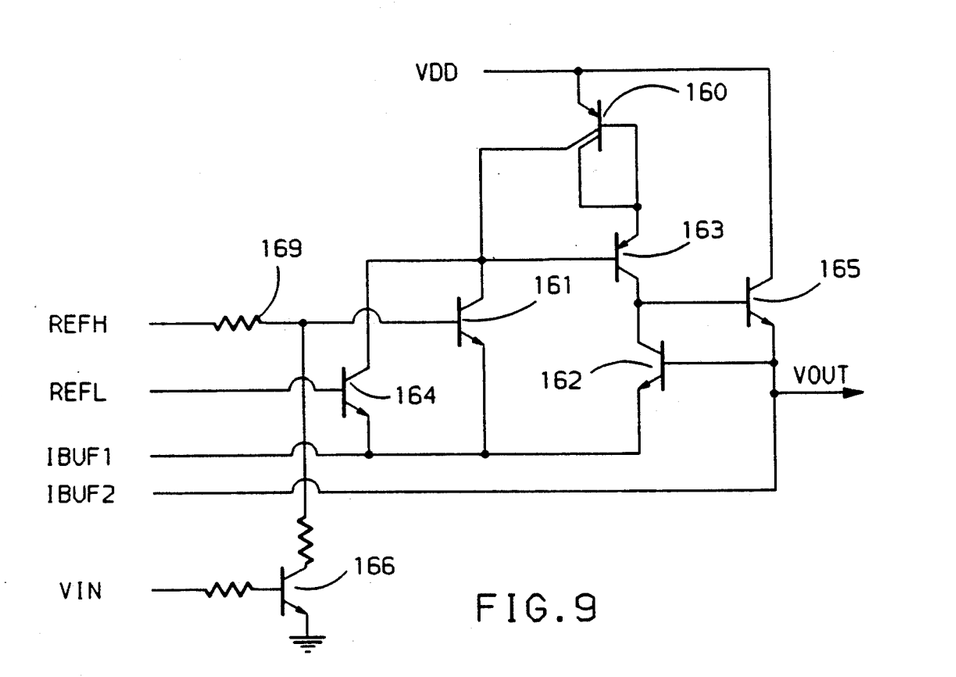

A circuit useful for buffer 108 is shown in FIG. 9. A PNP transistor 160 has an emitter provided with supply voltage VDD and a pair of collectors: one connected back to its base and the other connected to the collectors of NPN transistors 161 and 164 having emitters both connected to current sink IBUF1. The base of transistor 160 is connected to the emitter of a PNP transistor 163 having a base connected to the collectors of transistors 161 and 164 and further having a collector connected to the collector of an NPN transistor 162 with an emitter connected to IBUF1 and a base connected to current sink IBUF2 and an output terminal VOUT. The base of transistor 161 is connected through a resistor 169 to the 5.0 volt reference REFH; and the base of transistor 164 is connected to the 2.5 volt reference REFL. An NPN output transistor 165 has a collector connected to supply voltage VDD, a base connected to the collector of transistor 163 and an emitter providing output terminal VOUT connected to the base of transistor 162 and also to current sink IBUF1. Finally, an NPN input transistor 166 has a collector connected through a resistor 167 to the base of transistor 161, a grounded emitter and a base provided with the input voltage CLK2 through a resistor 168.

In operation, parallel transistors 161 and 164 on the left are balanced against transistor 162 on the right, with the left side transistor (161 or 164) having the lower base voltage being effectively removed from the circuit. The input CLK2 to the buffer circuit of FIG. 9 may be at a high (VDD) or low (ground) level. If input CLK2 is low, transistor 166 is turned off, and transistor 161, having 5.0 volts applied to its base, turns on to turn off transistor 162 and turn on output transistor 165 for a high output voltage on terminal VOUT. On the other hand, when input voltage CLK2 is high, transistor 166 is turned on to ground the base of transistor 161 and effectively remove it from the circuit. Transistor 164, having only 2.5 volts applied to its base, turns off as transsistor 162 turns on. The collector of transistor 162 pulls down the base of transistor 165 to turn it off. Thus, the output voltage on terminal VOUT switches between high and low voltages simultaneously with, but buffered from, the input voltage CLK2. A similar circuit may be used for buffer 109, with input CLK2 replaced with NCLK2 and IBUF1, IBUF2 replaced with IBUF3, IBUF4.

Figure 10:
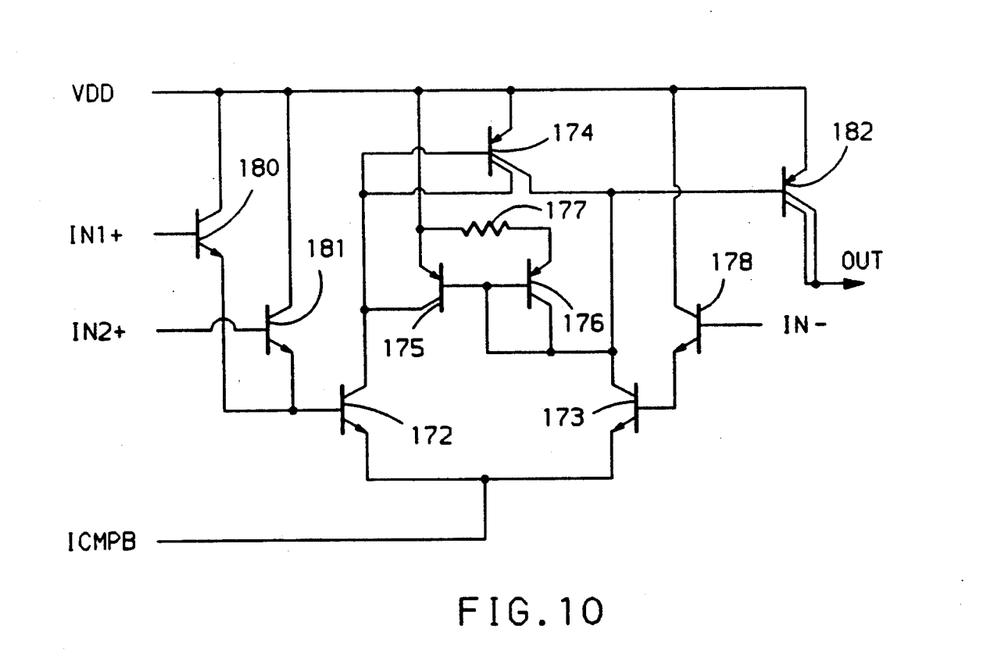

The circuit of comparator 102 is shown in FIG. 10. A pair of NPN transistors 172 and 173 have emitters connected to current sink ICMPB and collectors connected to first and second collectors of a PNP transistor 174 having an emitter connected to supply voltage VDD and a base connected to the collector of transistor 172 and thus to one of its own collectors. A PNP transistor 175 has a collector connected to the collector of transistor 172, an emitter connected to supply voltage VDD, and a base connected to the base of a PNP transistor 176 having a collector connected to its base and to the collector of transistor 173. The emitter of transistor 176 is connected through a resistor 177 to the emitter of transistor 175. Transistors 175 and 176 provide a small hysteresis for the circuit. An inverting input IN— is provided to comparator 102 through the base of an NPN transistor 178 having an emitter connected to the base of transistor 173 and a collector connected to supply voltage VDD. Non-inverting inputs IN1+ and IN2+ are provided through the bases of NPN transistors 180 and 181, respectively, each having an emitter connected to the base of transistor 172 and a collector connected to supply voltage VDD. An output PNP transistor 182 has an emitter connected to supply voltage VDD, a base connected to the collector of transistor 173 and a pair of collectors tied together to provide an output terminal.

In operation, the higher of inputs IN1+ and IN2+ is compared with input IN—. If either of the non-inverting inputs exceeds the inverting input, transistor 172 turns on hard and transistor 173 turns off. Transistor 182 therefore turns off for an open collector output, which is pulled low by a transistor in the following logic circuit. If the inverting input exceeds both non-inverting inputs, transistor 173 turns on hard to turn on transistor 182 and provide a high output. The same circuit can be used for comparator 101; however, one of the transistors 180 and 181 is not needed, since comparator 101 has only one non-inverting input. In addition, current sink ICMPA replaces ICMPB.

Figure 13:
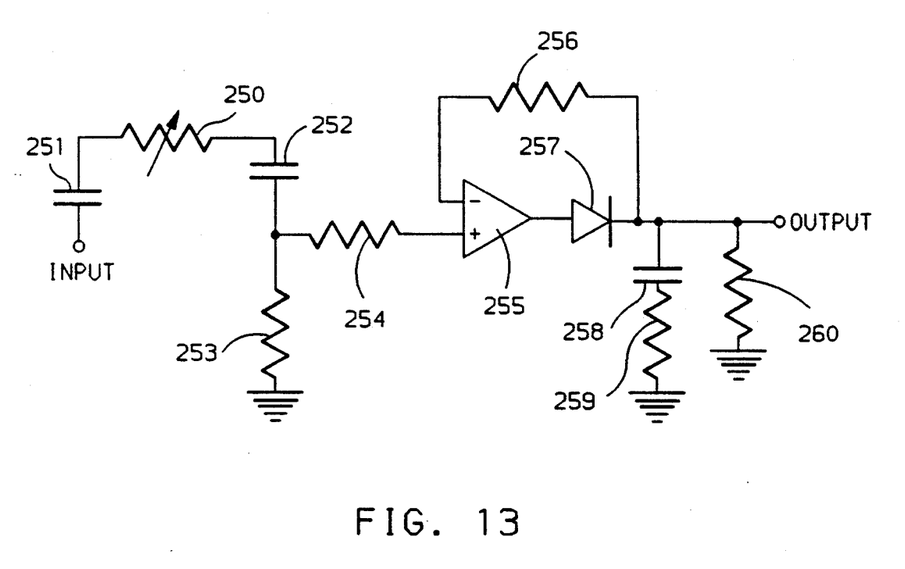
FIG. 13 shows an alternative input connection for a rain sensor.

An alternative input connection for rain sensor 5 is shown in FIG. 13. This connection is used in a case wherein a resistive rain sensor is capacitively coupled through the window glass to the electrical circuit, such as is shown in U.S. Pat. No. 4,827,198 to Mueller et al, issued May 2, 1989. The rain sensor resistance 250 resides on the outer surface of the window glass and has one end coupled to an INPUT terminal through a capacitance 251 between a first pair of electrodes on the outer and inner glass surfaces. Capacitance 252, which represents the capacitance between a second pair of electrodes on the outer and inner glass surfaces, connects the other end of resistor 250 through a fixed resistor 253 to ground. The junction of capacitance 252 and resistor 253 is connected through a resistor 254 to the non-inverting input of an op-amp 255 having an output connected in negative feedback through a resistor 256 to its inverting input. The output of op-amp 255 is further connected through a forward diode 257 to an OUTPUT terminal, the cathode of the diode being connected to ground through a capacitor 258 and resistor 259 in series and through a resistor 260.

An AC signal of a specific frequency is applied to the INPUT terminal. When this signal goes positive, it will charge capacitor 258, the voltage on which follows the rising signal. When the signal goes negative, capacitor 258 will discharge through resistor 260 with a specified time constant. This time constant may be adjusted so that the OUTPUT terminal will briefly hold a peak voltage for sampling. This peak voltage will vary with the resistance of rain sensor resistor 250. This output voltage may be provided to input terminal VIN1 of FIG. 5 for application to the non-inverting input of comparator 101.

Although the multiplex system has been described and is particularly suited for embodiments comprising a wiper control switch and a rain sensor input, it is applicable to any two wiper control signals originating on the passenger side of the vehicle firewall. For example, a standard wiper control switch may be paired with an additional wiper control device comprising a variable resistor of the type normally provided in intermittent wiper systems for continuous adjustment of intermittent delay. Such a variable resistor would replace rain sensor 5 in FIG. 1 and could be substituted directly for variable resistor 40 in FIG. 3. In the case of FIG. 5, the variable delay resistor, which would comprise a center tapped potentiometer, would replace the three resistors 116, 110 and 117 connected in series between buffer amplifiers 108 and 109 in FIG. 5, with the center tap connected through resistor 118 to terminal VIN1. In this case, since electrical polarization of water on the windshield is not a problem, buffer amplifiers 108 and 109 may be provided with fixed voltages rather than the outputs of DIV/2 circuit 107 and the filtering of resistor 118 and capacitor 119 may be increased. Since continuous delay adjustment would be provided, one of the AUTO positions of the wiper control switch, AUTO1 for example, would comprise a DELAY position; and the other AUTO positions could be eliminated or used for different functions. Another example is a signal generated by a rear wiper system for actuation or coordination of the front wiper system.

The additional wiper control device may even be a part of another vehicle system which generates a signal affecting wiper operation. For example, if a vehicle engine or body control computer generating a vehicle speed signal is located on the passenger side of the firewall, the engine speed signal may be provided as the other wiper control signal to, for example, vary intermittent delay time with vehicle speed. In another example, a vehicle windshield defrost or de-icing system may provide a wiper control signal when activated to provide a special mode of wiper operation suitable for a windshield covered with ice or snow or an ice break operation suitable for breaking free ice-bound wiper blades. Many other examples of wiper control devices suitable for use as the additional wiper control device in the wiper control systems described herein will occur to those skilled in the art of vehicle wiper system design.

The embodiments of the invention in which an exclusive property or privilege is claimed are defined as follows:

1. In a window wiper system for an automotive vehicle including a control switch, another wiper control device and a wiper mechanism including a motor, a two-channel time division multiplex controller, said controller comprising:
   a multiplex encoder and a multiplex decoder interconnected by a conductor extending through the firewall over which a multiplex control signal is applied from the encoder to the decoder;
   the multiplex encoder including means for generating the multiplex control signal as a cyclical waveform containing alternating cycles of different first and second periods wherein the duty cycle of the first period cycles is determined by the other wiper control device and the duty cycle of the second period cycles is determined by the control switch; and
   the multiplex decoder including means for controlling the wiper mechanism in response to the respective duty cycles of the first period cycles and the second period cycles.

2. The window wiper system of claim 1 in which the other wiper control device is a rain sensor.

3. The controller of claim 2 in which the rain sensor comprises a resistor on the outer surface of the vehicle window having a resistance varying with rain on the vehicle window and the multiplex encoder comprises, in combination:
   means incorporating the rain sensor in a resistive voltage divider with an output terminal;
   means for applying a predetermined voltage across the resistive voltage divider; and
   means responsive to the voltage on the output terminal of the resistive voltage divider with the predetermined voltage applied thereacross to determine the duty cycle of the first period cycles.

4. The controller of claim 3 in which the resistor of the rain sensor is capacitively coupled through at least a portion of the vehicle window to the multiplex encoder.

5. The window wiper system of claim 1 in which the other wiper control device is a wiper delay control.

6. The window wiper system of claim 1 in which the other wiper control device is a vehicle speed signal generator.

7. The window wiper system of claim 1 in which the other wiper control device generates a signal indicating an iced window condition.

8. The controller of claim 1 in which the means for generating the multiplex control signal comprises, in combination:
   means for generating an oscillating signal having alternating long and short periods;
   means for providing duty cycle modulation of the long periods of the oscillating signal with the duty cycles of alternating ones of the long periods being determined by the other wiper control device and the control switch, respectively; and
   means for combining the short periods of the oscillating signal alternately with the preceding and following long periods of the oscillating signal so as to provide the control signal with one of the first and second periods comprising one of the long periods together with the preceding and following short periods and the other of the first and second periods comprising the next successive long period.

9. The controller of claim 8 in which:
   the means for generating an oscillating signal further generates a ramp signal during each long period of the oscillating signal;
   the means for providing duty cycle modulation of the long periods of the oscillating signal comprises means for generating a first step signal when the ramp signal equals a rain sensor determined reference and means for generating a second step signal when the ramp signal equals a control switch determined reference; and
   the means for combining comprises logic elements receiving the first and second step signals and further signals derived from the oscillating signal so as to generate the control signal with alternating first and second step signals in a first direction with each pair of adjacent first and second step signals being separated by a third step signal in a second direction opposite the first direction, the timing of the third step signal alternating between the beginning and end of corresponding short periods.

10. In a windshield wiper system for an automotive vehicle including a firewall separating the passenger compartment from the engine compartment, and further including a variable position control switch and another wiper control device located on the passenger side of the vehicle firewall, and a wiper mechanism including a motor located on the engine side of the firewall; a two-channel time division multiplex controller, said controller comprising:

a multiplex encoder located on the passenger side of the firewall and a multiplex decoder located on the engine side interconnected by a conductor extending through the firewall over which a multiplex control signal is applied from the encoder to the decoder, the multiplex encoder including:

a base signal generator for generating a base signal having alternate first and second periods of different duration, first and second slave signal generators slaved to the base signal generator for generating first and second slave signals having the alternate first and second periods of the base signal but phase shifted in respect to the base signal by separate amounts determined by the output of the other wiper control device and the position of the control switch, respectively, and means for logically combining the base signal and the first and second slave signals to generate a cyclical multiplex control signal in which alternate cycles are of the first and second periods, respectively, and the duty cycles of the first and second period cycles are determined by the amount of phase shift between the base signal and the first and second slave signals, respectively;

the multiplex decoder including means for controlling the wiper mechanism in response to the respective duty cycles of the first period cycles and the second period cycles;

thereby to provide two-channel timed division multiplex operation in which the output of the other wiper control device is conveyed in one channel of the multiplex control signal as represented by the duty cycle of the first period cycles and the control switch position is conveyed in the other channel of the multiplex control signal as represented by the duty cycle of the second period cycles.

11. In a window wiper system for an automotive vehicle including a control switch, another wiper control device and a wiper mechanism including a motor, a two-channel time division multiplex controller, said controller comprising, in combination:

an oscillator effective to generate an oscillating signal having alternating long and short periods and a ramp signal during each of the long periods;

a first comparator effective to generate a first step signal when the ramp signal equals a control switch determined reference;

a second comparator effective to generate a second step signal when the ramp signal equals a reference determined by the other wiper control device;

a divider responsive to the oscillator to indicate alternating ones of the long and short periods; and a logic circuit responsive to the oscillator, the first and second comparators and the divider for generating a control signal comprising alternating ones of the first and second step signals in a first direction with each pair of adjacent first and second step signals being separated by a third step signal in a second direction opposite the first direction, the timing of the third step signals alternating between the beginning and end of corresponding short periods.

12. The controller of claim 11 in which the third step signals following the second step signals are timed with the beginning of the corresponding short periods so that first periods of the control signal defined between successive third step signals with an intermediate first step signal are longer than alternating second periods of the control signal defined between successive third step signals with an intermediate second step signal.

13. In a window wiper system for an automotive vehicle including a control switch, a resistive rain sensor mounted on an external surface of a vehicle window and a wiper mechanism including a motor controlled at least in part in response to a rain sensor signal and in part in response to another wiper signal, apparatus for generating a wiper control signal comprising, in combination:

means for determining periods of substantially equal time duration during which the rain sensor is alternately monitored and not monitored;

means effective to provide a DC voltage across the rain sensor in a first direction during those periods in which the rain sensor is monitored and in an opposite direction during those periods in which the rain sensor is not monitored, whereby electrical polarization of water on the vehicle window is minimized; and means for generating the rain sensor signal in response to the resistance of the rain sensor during those periods in which the rain sensor is monitored and generating another wiper signal during those periods in which the rain sensor is not monitored.

14. In a window wiper system for an automotive vehicle including a resistive rain sensor mounted on an external surface of a vehicle window and a wiper mechanism including a motor controlled at least in part in response to a rain sensor signal and in part in response to an additional wiper signal, apparatus for generating a wiper control signal comprising, in combination:

means for generating an oscillating signal of alternating long and short periods;

a dividing circuit responsive to the oscillating signal generating means to generate a divided signal which reverses polarity with each full cycle of the oscillating signal;

means responsive to the dividing circuit to provide a DC voltage across the rain sensor which reverses polarity with the divided signal, whereby electrical polarization of water on the vehicle window is minimized;

means for generating the rain sensor signal in response to the resistance of the rain sensor during long periods of the oscillating signal when the polarity of the DC voltage across the rain sensor is in a first direction; and means for generating the additional wiper signal during long periods of the oscillating signal when the polarity of the DC voltage across the rain sensor is in a second direction.

* * * * *